United States Patent

[11] 3,630,378

| [72] | Inventor | William C. Bauman<br>Midland, Mich. |
| --- | --- | --- |
| [21] | Appl. No. | 731,981 |
| [22] | Filed | May 24, 1968 |
| [45] | Patented | Dec. 28, 1971 |
| [73] | Assignee | The Dow Chemical Company<br>Midland, Mich. |

[54] NOVEL WATER TREATING AND STORAGE APPARATUS
10 Claims, 2 Drawing Figs.

[52] U.S. Cl. ........................................ 210/257,
210/321
[51] Int. Cl. ........................................ B01d 31/00
[50] Field of Search ........................... 210/22, 23,
321, 257, 258

[56] References Cited
UNITED STATES PATENTS
3,505,216  4/1970  Kryzer ........................ 210/257 X Primary Examiner—Frank A. Spear, Jr.
Attorneys—Griswold & Burdick and H. L. Aamoth ABSTRACT: A novel water treating apparatus is disclosed having a unique capability of in combination treating and storing the treated water, supplying at instantaneous demand needs and at line pressure treated water and/or service water and continuously replenishing the supply of treated water without the need for elaborate or special timing devices, switches, valving arrangements, etc. The apparatus is especially useful in softening or desalting water by reverse osmosis, electrodialysis and the like.

INVENTOR.
William C. Bauman
BY
H. L. Aamoth
AGENT

NOVEL WATER TREATING AND STORAGE APPARATUS

BACKGROUND OF THE INVENTION

This invention relates to a novel apparatus for separately providing treated water, such as softened or desalted water and the like, and service water at instantaneous demand needs and at line pressure.

Many water supplies are not suitable for either home or industrial use by reason of the water being hard, i.e., containing such salts as soluble calcium, magnesium and like metal salts, or the water may contain a high level of soluble salts such as is found in brackish water, sea water and the like. Consequently such water supplies require treatment of some kind to soften the water, desalt the water and the like before the water may be used.

In addition to treating the water it is highly desirable that this treated water by (1) available in sufficient quantity to satisfy periodic demands on the system in excess of the capacity of the treating unit to supply treated water, (2) available at line pressure and (3) available only where and when it is needed.

Many industrial and household needs do not need treated water and only a portion of the water needs are for treated water. For example, in the home it is desirable to have softened water for washing, cooking, etc., but it would be wasteful to soften the water used to flush toilets, etc. Or, industrially, process water quality needs may vary greatly with respect to cooling water or other service water requirements.

Water demand is also, usually, periodic. For example, the daily average demand for an average home may be 200 to 400 gallons per day, but there is usually almost no water demand between midnight and 6 a.m. In addition a householder expects an instantaneous supply of water of about 2 to 5 gallons per minute at the turn of a tap. Under these conditions a water treating apparatus without any storage capacity becomes uneconomical and impractical if the water treating unit is built to supply the instantaneous demand volume rather than sized in proportion to the total daily need.

Known methods of treating water are not capable of separately providing treated water and/or service water as needed without resorting to elaborate storage systems. Separate storage systems require shutoff valves and usually yield water at varying pressures depending upon whether the storage vessel is full and on the nature of the separate pressurizing means which is usually required.

SUMMARY OF THE INVENTION

Accordingly this invention is related to a water treating and storage apparatus which is capable of providing treated water at line pressure and in amounts sufficient to satisfy instantaneous demands, continuously replenishing and storing the treated water and separately providing service water on demand at line pressure. Advantageously the apparatus utilizes a reverse osmosis or an electrodialysis water treating unit to soften, desalt, etc. the water.

The apparatus comprises in combination (a) a first storage vessel for treated water connected at the bottom to an untreated (raw) water supply and having connecting means from its top portion to allow withdrawal of treated water; (b) a second storage vessel for service water connected at the top to said untreated water supply and having connecting means from the bottom portion to allow withdrawal of service water; (c) a water treating unit connected to the untreated water supply and having a treated water exit connected to the top portion of the first vessel and a waste effluent or brine exit connected to the bottom portion of the second vessel; and (d) fluid flow means adapted to simultaneously cause untreated water to flow into said water treating unit and treated water and waste effluent to flow therefrom.

When treated water is being withdrawn for use, untreated water at line pressure flowing in at the bottom of the first vessel displaces treated water from the first vessel. Likewise when service water is being withdrawn for use, untreated water at line pressure flowing in at the top of the second vessel displaces the waste effluent. When no service water or treated water is being withdrawn a pump continues to draw untreated water from the bottom of the first vessel and from the top of the second vessel and feeds it to the water treating unit. Thereby, simultaneously, treated water is returned to replenish the treated water supply in the first vessel and the waste effluent is returned to the second vessel.

The invention further contemplates combining the two storage vessels into one with the untreated water line connected, generally, to the central portion of the vessel and treated water is stored in the upper portion of the vessel while waste effluent is stored in the lower portion.

Water, both treated water and service water, at full line pressure is available on demand, and the reverse osmosis unit may operate continuously day and night to replenish the treated liquid supply without the need for special time control valves or switches.

DRAWINGS

The invention may be more fully understood by reference to the more detailed description which follows and to the following drawings.

DETAILED DESCRIPTION

Reverse osmosis is a process for separating fluid components by means of permselective or semipermeable membranes. If, for example, a water solution of a salt such as sodium chloride is placed on one side of a permselective membrane and water only is placed on the other side, water will pass through the membrane into the salt solution. The force causing this transfer varies with the type of solvent, the concentration of the salt, etc. but this force is a measurable force or pressure for any given membrane and composition.

If there is now applied to the salt solution a pressure in excess of this force (specific osmotic pressure) the reverse process will take place, i.e., water will pass from the salt solution through the membrane to the other side. This process is called reverse osmosis and has been extensively studied and tested for such uses as obtaining potable water from sea water or brackish water, softening water and the like.

All manner of membrane materials which possess permselective characteristics useful in separations by reverse osmosis are useful in the apparatus of this invention. Likewise the mechanical arrangements may be quite varied as well as the configuration of the membrane. Earlier work utilized mainly uniplanar membranes which required a backing or support for the membrane.

A significant improvement in reverse osmosis resulted from the use of fine bore, hollow permeable fibers such as can be made from acetylated cellulose and other synthetic polymeric materials. Some of the devices and utility of permeable hollow fiber separatory devices are described in U.S. Pat. No. 3,228,876 and 3,228,877 issued to Mahon. Preferably this invention utilizes reverse osmosis water separatory units based on hollow fiber separatory elements.

Another useful method for softening or desalting water is electrodialysis. Electrodialysis is a process wherein electrolytes are transferred through a semipermeable membrane as a result of the application of electrical energy. The development of practical, semipermeable membranes having a wide range of ion-selective characteristics has greatly stimulated the growth and availability of commercially useful units.

The simplest process involves a three compartment cell wherein a cation and an anion permeable membrane are utilized to separate the compartments. Multiple compartment, alternate cation and anion permeable membrane cell provide more efficient and economical electrodialysis units.

A wide variety of material, designs, operating variables, etc. are well known and are described in many publications and books. One summary of considerable value in describing electrodialysis as a unit operation is that of W. K. W. Chen appearing at pages 846–865 in "Kirk-Othmer Encyclopedia of Chemical Technology," 2nd edition, Volume 7 (1965, Interscience Publishers, New York), which is incorporated herein by reference.

Figure 1:
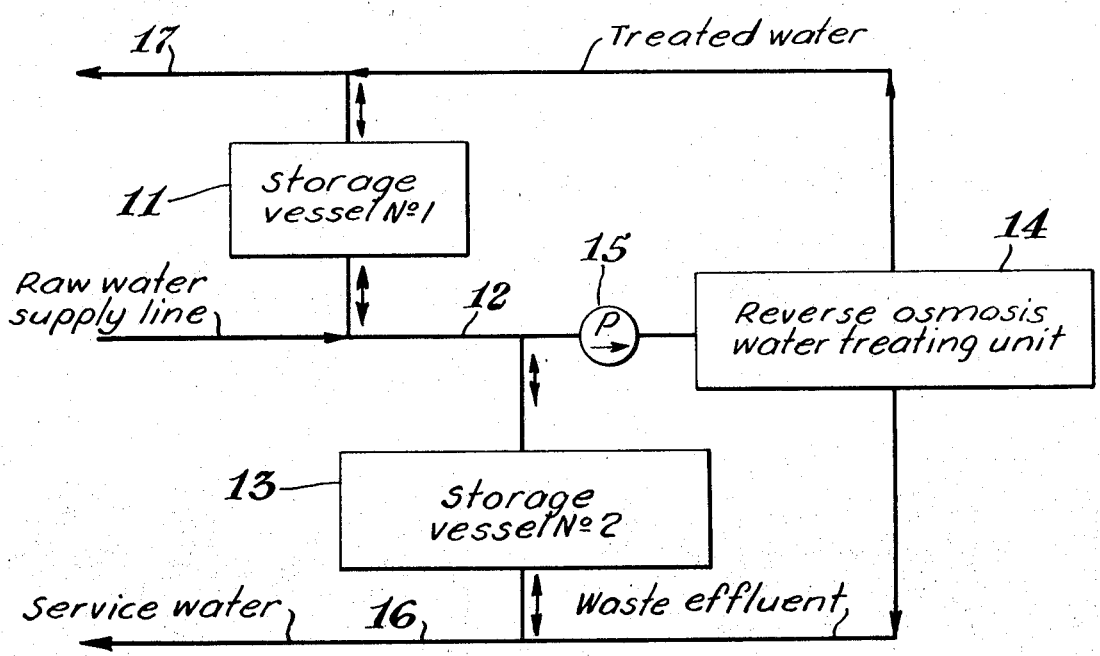
FIG. 1 is a schematic flow diagram of one embodiment of the apparatus of this invention which utilizes two storage vessels and a reverse osmosis water treating unit.

A specific embodiment of this invention is shown in FIG. 1. A first storage vessel 11 is connected at the bottom to a raw water supply line 12. A second storage vessel 13 is connected at the top to said raw water supply 12. A reverse osmosis water treating unit 14 is connected to the raw water supply by a pump 15 which pressurizes the raw water fed to the unit 14. Treated water from the reverse osmosis unit is piped to the top of the first vessel 11 and stored therein. The waste effluent from the unit 14 is pumped to the bottom of the second vessel 13 and stored therein. A service water line 16 is connected to the bottom of the second vessel 13 and a treated water line 17 is connected to the top of the first vessel 11. Various modifications may be made in the piping, etc. without departing from the scope of the invention.

When no water is being withdrawn from either the treated water line 17 or the service line 16 the pump 15 withdraws raw water from the bottom of the first vessel 11 and the top of the second vessel 13 and feeds it under pressure to the reverse osmosis unit 14. The treated water (permeate) is piped to the top of the first vessel 11 thereby building up a supply of treated water in the first vessel 11. Simultaneously, the waste effluent (brine) is pumped to the bottom of the second vessel 13. In this manner the apparatus continuously replenishes the supply of treated water for use when needed and stores the waste effluent for discharge as service water without requiring any special timing devices, valving arrangements, switches, etc. Alternately the waste effluent could be separately discharged to the sewer and only raw water used as service water.

Upon demand, treated water may be withdrawn from the first vessel 11 at full line pressure and/or service water may also be withdrawn at full line pressure from the second vessel 13. A sufficient amount of water may be readily stored in the first vessel 11 to supply any short term needs and the supply is continuously replenished.

Figure 2:
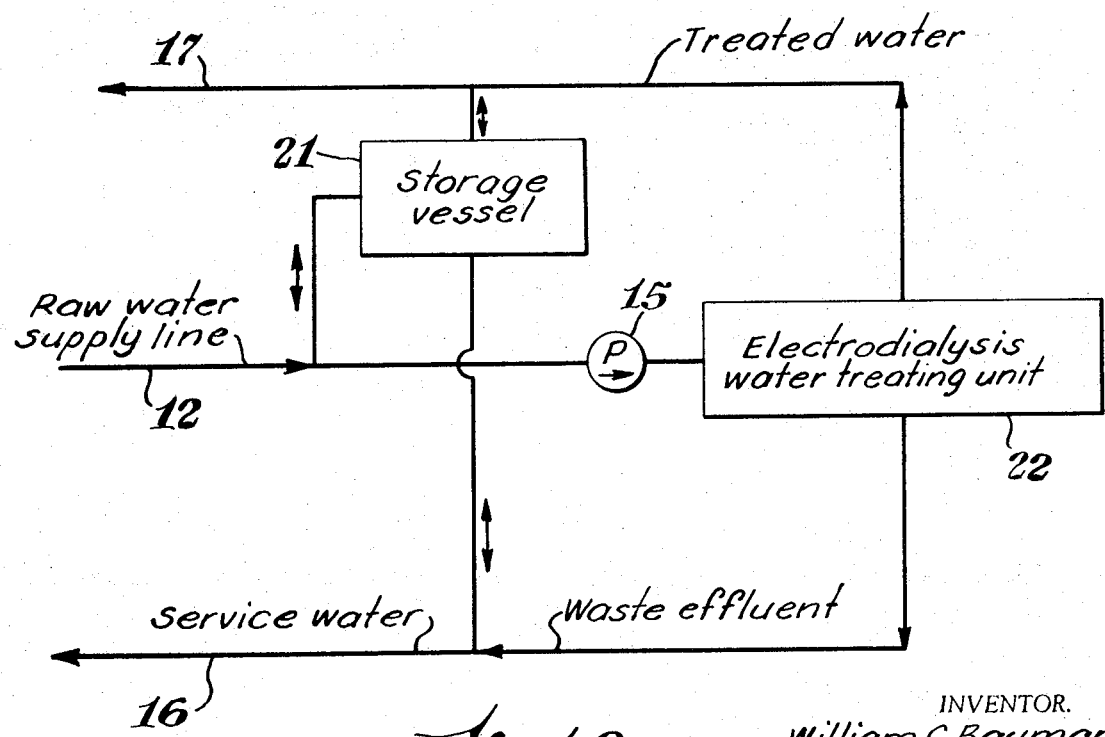
FIG. 2 is a schematic flow diagram of another embodiment of the invention which utilizes a single storage vessel and an electrodialysis water treating unit.

An alternate embodiment is shown in FIG. 2 wherein the storage vessels of FIG. 1 are combined into one vessel 21. The raw water supply line 12 is connected to the vessel 21 at about a central position. A pump 15, as before, supplies raw water to an electrodialysis unit 22 which in turn supplies treated water for storage in the top portion of the vessel 21 and waste effluent to the bottom portion with raw water stored in between. Alternately the waste effluent may be discharged to the sewer. Also a treated water line 17 and a service line 16 are connected to the top and to the bottom, respectively, of the storage vessel 21.

The apparatus of FIG. 2 operates in a similar manner to that of FIG. 1 in that treated water and/or service water may be withdrawn at full line pressure as needed and the electrodialysis unit continuously replenishes the supply of treated water.

An apparatus utilizing a reverse osmosis water treating unit was constructed according to the design of FIG. 2. The reverse osmosis unit comprised a polyvinylchloride casing constructed from schedule 40 2 inch I.D. commercial pipe and appropriate pipe fittings. The separatory element sealed within the casing utilized about 0.73 pounds of permeable, hollow cellulose triacetate fibers each having an O.D. of about 45$\mu$ and an I.D. of about 27$\mu$ and a length of about 65 cm. The bundle of fibers was potted at the terminal portions with an epoxy resin and after curing the resin was cut perpendicularly to the longitudinal axis of the fibers to expose open fiber ends.

The above apparatus was first tested in a simulated home water treatment system. After completely filling the system with water having a hardness of about 138 p.p.m. the reverse osmosis unit was operated overnight on a closed loop, i.e., no treated (softened) water or service water was withdrawn. The unit was operated under a pressure of 200 p.s.i. at a nominal pumping rate of 0.5 g.p.m. The unit had a permeation rate of about 610 cc./min. After 16 hours of operation, soft water (permeate) was withdrawn from the top of the storage tank at a rate of 7 g.p.m. and sampled in 5 gal. increments for conductivity. A volume of 50 gal. (about equal to the storage volume of the tank above the raw water inlet baffle) was withdrawn before there was an increase in salinity (hardness). The hardness of the permeate from the reverse osmosis unit was about 21 p.p.m.

The apparatus was next checked under different operating pressures for the reverse osmosis unit in a single-pass operation. The details and results are summarized below:

| | | | |
|---|---|---|---|
| Pressure, p.s.i.g. | 210 | 150 | 100 |
| Permeation rate, cc./min. | 573 | 377 | 242 |
| Water Effluent rate, cc./min. | 2,200 | 2,300 | 2,480 |
| Raw Water Feed rate, g.p.m. | 0.73 | 0.71 | 0.72 |
| Raw Water Hardness, p.p.m. | 120 | 120 | 120 |
| Permeate Water Hardness, p.p.m. | 15 | 11–14 | 14 |
| Waste Effluent Hardness, p.p.m. | 150 | 140 | 133 |

The apparatus was further checked by operating the cell overnight under the raw water line pressure of 75–90 p.s.i. The water temperature was 19° C.

| | Feed | Permeate | Waste Effluent |
|---|---|---|---|
| Rate, cc./min. | 1,037 | 227 | 810 |
| Hardness, p.p.m. | 131 | 24.4 | 153 |

Similar results are obtained if the apparatus is constructed with two storage vessels according to FIG. 1.

The invention is particularly valuable for use in home water systems where the water must be softened, desalted or the like. However, the invention has considerable value for use with humidifiers, air conditioning systems, boiler water makeup systems and the like which are found in apartment buildings, office buildings, theaters, etc., as well as considerable value in a variety of industries.

The vessels, piping, pumps, etc. necessary to this invention may be constructed from a wide variety of materials, such as metals and plastics and the like and are readily constructed or available in a variety of sizes.

Service water, as used herein, is meant to include the waste effluent from the reverse osmosis unit, untreated water or a mixture of untreated water and the waste effluent.

Further modifications of the disclosed invention, particularly with respect to piping arrangements, selection of pumps, location of pumps, etc. may be made within the spirit and scope of the invention and will be obvious to those skilled in the art. For example, in addition to being located on the feed side of the water treating unit, a pump 15 may be located on either or both of the outlet sides of said unit. Or pumps may be located both on an outlet side and the feed side of said water treating unit and may be positive displacement pumps, centrifugal pumps and the like. The particular choice and arrangement will vary depending on the type of water treating unit, nature of the water, pressure differentials required, operating line pressure and the like.

I claim:

1. An apparatus for separately providing treated water and service water on demand at line pressure wherein said apparatus has a novel storage system for the treated water and a means for continuously replenishing the supply of treated water, said apparatus comprising in combination
   a. a first storage vessel for treated water, said first vessel having connecting means from its top portion so as to allow withdrawal of treated water and connected from its bottom portion to an untreated water supply;

b. a second storage vessel for service water, said second vessel connected from its top portion to said untreated water supply and having connecting means from its bottom portion so as to allow withdrawal of service water;

c. a reverse osmosis water treating unit connected to said untreated water supply, said unit having a treated water exit connected to the top portion of the first storage vessel and a waste effluent exit connected to the bottom portion of the second storage vessel; and d. fluid flow means adapted to simultaneously cause untreated water to flow into said water treating unit, under a fluid pressure differential sufficient to oppose the osmotic pressure and treated water and waste effluent to flow therefrom.

2. The apparatus of claim 1 wherein said reverse osmosis unit utilizes at least one uniplanar permeable membrane separatory element.

3. The apparatus of claim 1 wherein said reverse osmosis unit utilizes a multiplicity of fine, hollow permeable fiber separatory elements.

4. The apparatus of claim 1 wherein said reverse osmosis unit is a water softening unit.

5. The apparatus of claim 1 wherein said reverse osmosis unit is a water desalting unit.

6. The apparatus of claim 1 wherein the first and second storage vessels are combined into one vessel in such a manner that, in correspondence to the first vessel, the top portion is connected to the treated water exit of said unit and has connecting means to allow withdrawal of treated water and that, in correspondence to the second vessel, the bottom portion is connected to the waste effluent exit of said unit and has connecting means to allow withdrawal of service water; and wherein said combined vessel is connected from its central portion to the untreated water supply line.

7. The apparatus of claim 6 wherein said reverse osmosis unit utilizes at least one uniplanar permeable membrane separatory element.

8. The apparatus of claim 6 wherein said reverse osmosis unit utilizes a multiplicity of fine, hollow permeable fiber separatory elements.

9. The apparatus of claim 6 wherein said reverse osmosis unit is a water softening unit.

10. The apparatus of claim 6 wherein said reverse osmosis unit is a water desalting unit.

* * * * *